US007312751B1

(12) United States Patent
Voyce et al.

(10) Patent No.: US 7,312,751 B1
(45) Date of Patent: Dec. 25, 2007

(54) PHASED ARRAY ANTENNA SYSTEM TO ACHIEVE SUPPRESSION OF UNDESIRED SIGNAL COMPONENTS

(75) Inventors: Kenneth G. Voyce, Bellevue, WA (US); Bruce L. Blaser, Auburn, WA (US); Paul R. Norris, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/554,357

(22) Filed: Oct. 30, 2006

(51) Int. Cl.
*G01S 3/16* (2006.01)

(52) U.S. Cl. ...................................... 342/380; 342/379

(58) Field of Classification Search ................ 342/379, 342/380, 382, 383, 434
See application file for complete search history.

(56) References Cited

U.S. PATENT DOCUMENTS 3,763,491 A * 10/1973 Ishman ...................... 342/401
4,724,439 A * 2/1988 Wiley et al. ................ 342/351
5,107,273 A * 4/1992 Roberts ...................... 342/417

* cited by examiner

*Primary Examiner*—Dao Phan
(74) *Attorney, Agent, or Firm*—MacPherson Kwok Chen & Heid LLP; Brent A. Folsom

(57) ABSTRACT

Various techniques are disclosed to suppress undesired signal components introduced by non-linear amplifiers of phased array antenna systems to accommodate bandwidths greater than one octave. For example, in accordance with one embodiment, a phased array antenna system includes first and second antenna elements adapted to provide first and second received signals in response to a radio signal. The second antenna element is rotated approximately 180 degrees in relation to the first antenna element. Amplifiers may amplify the received signals to provide amplified signals having a bandwidth greater than one octave. Undesired components of the amplified signals introduced by the amplifiers may be suppressed through appropriate phase shifts performed by associated phase shifters and/or power combiners. A power combiner may combine the first and second output signals to provide a combined signal, wherein the first and second undesired components are suppressed in the combined signal relative to the amplified signals.

36 Claims, 5 Drawing Sheets

PHASED ARRAY ANTENNA SYSTEM TO ACHIEVE SUPPRESSION OF UNDESIRED SIGNAL COMPONENTS

TECHNICAL FIELD

The present invention relates generally to antenna-based communication systems and, more particularly, to phased array antenna systems.

BACKGROUND

Phased array antenna systems are often used in connection with modern communication networks to provide sophisticated beam-formed signals. Such systems typically include a plurality of antenna elements which may provide incoming signals to associated amplifiers which provide a plurality of amplified signals. The amplified signals may then be processed by associated phase shifters and a power combiner/splitter as desired for beam steering.

However, amplifiers of conventional phased array antenna systems generally do not exhibit perfectly linear transfer functions. In particular, non-linear amplifiers may generate undesired components such as intermodulation products (for example, harmonics) or other signal components which may distort the amplified signals. These undesired signal components can limit the dynamic range capability of the system. For example, undesired even order products introduced by non-linear amplifiers can mask smaller desired signal components and cause downstream errors when the amplified signals are subsequently decoded.

Antenna elements of such systems are generally implemented to accept a bandwidth narrower than an octave. In order to facilitate convenient packaging of such narrow band antenna elements and physical routing of their associated connections, some of the narrow band antenna elements may be oriented approximately 180 degrees relative to other narrow band antenna elements. Narrow band antenna elements typically do not suffer performance degradation due to even order nonlinearity because undesired even order products (e.g., second harmonics and sum and difference frequencies) are generated are out of band (i.e., outside the octave bandwidth). In narrow band implementations, even order products introduced by non-linear amplifiers may be attenuated by a bandwidth restricting filter. Nevertheless, such filtering cannot be applied to systems supporting a bandwidth greater than one octave. In such cases, the second harmonic of a signal at the low frequency end of the band will fall in-band and therefore cannot be attenuated by filtering.

An alternative approach to handling undesired signal components relies on balanced amplifier techniques to suppress the energy of even order products that are created in the individual amplifiers. In this approach, a signal received by a single antenna element may be split into two signals by a 180 degree power splitter. The split signals are then amplified by two separate amplifiers. The even order product energy introduced by the amplifiers into the amplified signals may then be suppressed by combining the amplified signals using a 180 degree power combiner/splitter.

Unfortunately, this alternative approach can be difficult to implement. In particular, two separate amplifiers are required for each individual antenna element of the system. Such additional components may be cost-prohibitive to implement and difficult to accommodate in existing phased array antenna systems.

Accordingly, there is a need for an improved phased array antenna implementation that facilitates reliable reception and amplification of signals having a bandwidth greater than one octave. In particular, there is a need for a system that supports the suppression of undesired components introduced by amplifiers of the system that does not require extensive redesign of existing components and supports size, power consumption, manufacturing, and cost constraints of existing systems. There is also a need for an improved method of suppressing undesired signal components introduced by such amplifiers.

SUMMARY

In accordance with one embodiment of the present invention, a phased array antenna system includes a first antenna element adapted to provide a first received signal in response to a radio signal; a second antenna element adapted to provide a second received signal in response to the radio signal, wherein the second antenna element is rotated approximately 180 degrees in relation to the first antenna element; a first amplifier adapted to amplify the first received signal to provide a first amplified signal having a bandwidth greater than one octave and having a first undesired component introduced by the first amplifier; a second amplifier adapted to amplify the second received signal to provide a second amplified signal having a bandwidth greater than one octave and having a second undesired component introduced by the second amplifier; a first phase shifter adapted to adjust a phase of the first amplified signal by a first phase amount to provide a first output signal; a second phase shifter adapted to adjust a phase of the second amplified signal by a second phase amount to provide a second output signal; and a power combiner adapted to combine the first and second output signals to provide a combined signal, wherein the first and second undesired components are suppressed in the combined signal relative to the first and second amplified signals.

In accordance with another embodiment of the present invention, a method of suppressing undesired signal components includes receiving a radio signal at a first antenna element and a second antenna element of a phased array antenna system, wherein the second antenna element is rotated approximately 180 degrees in relation to the first antenna element; providing first and second received signals from the first and second antenna elements, respectively, in response to the radio signal; amplifying the first received signal to provide a first amplified signal having a bandwidth greater than one octave and having a first undesired component; amplifying the second received signal to provide a second amplified signal having a bandwidth greater than one octave and having a second undesired component; adjusting a phase of the first amplified signal by a first phase amount to provide a first output signal; adjusting a phase of the second amplified signal by a second phase amount to provide a second output signal; and combining the first and second output signals to provide a combined signal, wherein the first and second undesired components are suppressed in the combined signal relative to the first and second amplified signals.

In accordance with another embodiment of the present invention, a phased array antenna system includes a power splitter adapted to split a received signal to provide a first input signal and a second input signal; a first phase shifter adapted to adjust a phase of the first input signal by a first phase amount to provide a first output signal; a second phase shifter adapted to adjust a phase of the second input signal by a second phase amount to provide a second output signal; a first amplifier adapted to amplify the first output signal to provide a first amplified signal having a bandwidth greater than one octave and having a first undesired component introduced by the first amplifier; a second amplifier adapted to amplify the second output signal to provide a second amplified signal having a bandwidth greater than one octave and having a second undesired component introduced by the second amplifier; a first antenna element; and a second antenna element rotated approximately 180 degrees in relation to the first antenna element, wherein the first and second antenna elements are adapted to transmit the first and second amplified signals, respectively to provide a combined signal, wherein the first and second undesired components are suppressed in the combined signal relative to the first and second amplified signals.

In accordance with another embodiment of the present invention, a method of suppressing undesired signal components includes splitting a received signal to provide a first input signal and a second input signal; adjusting a phase of the first input signal by a first phase amount to provide a first output signal; adjusting a phase of the second input signal by a second phase amount to provide a second output signal; amplifying the first output signal to provide a first amplified signal having a bandwidth greater than one octave and having a first undesired component; amplifying the second output signal to provide a second amplified signal having a bandwidth greater than one octave and having a second undesired component; and providing a combined signal, wherein the providing comprises: transmitting the first amplified signal from a first antenna element of a phased array antenna system, and transmitting the second amplified signal from a second antenna element of the phased array antenna system, wherein the second antenna element is rotated approximately 180 degrees in relation to the first antenna element, wherein the first and second undesired components are suppressed in the combined signal relative to the first and second amplified signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
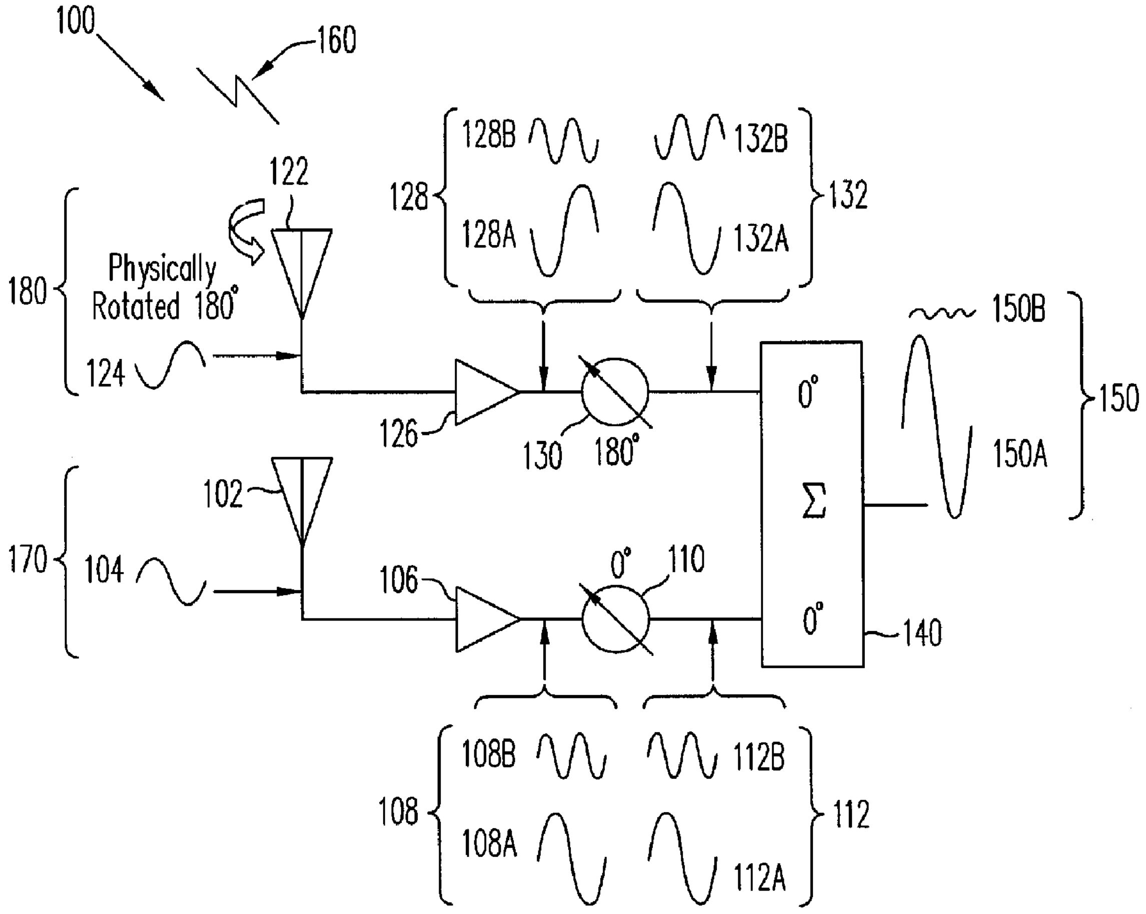
FIG. 1 illustrates a phased array antenna system configured to suppress undesired components of amplified signals in accordance with an embodiment of the present invention.

FIG. 1 illustrates a phased array antenna system 100 configured to suppress undesired components of amplified signals in accordance with an embodiment of the present invention. Phased array antenna system 100 includes signal paths 170 and 180 which include associated antenna elements 102 and 122, amplifiers 106 and 126, and phase shifters 110 and 130. As illustrated, phased array antenna system 100 also includes a power combiner/splitter 140 which receives output signals from signal paths 170 and 180 as will be further described herein. In various embodiments, all components of FIG. 1 may be implemented to accommodate signals having bandwidths greater than one octave.

Antenna elements 102 and 122 may be configured to receive a radio signal 160 that exhibits a bandwidth greater than one octave. Antenna elements 102 and 122 may be implemented as any appropriate structures which may be used to receive radio signal 160 such as, for example, dipole antennas, horn antennas, or other appropriate structures.

As shown in FIG. 1, antenna element 122 is physically rotated approximately 180 degrees in relation to antenna element 102. As a result, a received signal 124 provided by antenna element 122 in response to radio signal 160 will exhibit a phase shift of approximately 180 degrees when compared to a received signal 104 provided by antenna element 102.

Received signals 104 and 124 are provided to amplifiers 106 and 126, respectively, which amplify received signals 104 and 124 to create amplified signals 108 and 128, respectively. Each of amplifiers 106 and 126 may exhibit a non-linear transfer function. As a result, amplified signals 108 and 128 may each exhibit undesired signal components.

For example, amplified signal 108 may be viewed as a composite signal that includes an a desired component 108A (i.e., an amplified version of received signal 104) and an undesired component 108B introduced by amplifier 106. Similarly, amplified signal 128 may also be viewed as a composite signal that includes a desired component 128A (i.e., an amplified version of received signal 124) and an undesired component 128B introduced by amplifier 126.

Undesired components 108B and 128B may include any undesirable portion of amplified signals 108 and 128 introduced by amplifiers 106 and 126 including, for example, even order products (e.g., harmonics) or other signal components. Because radio signal 160 and corresponding received signals 104 and 124 may exhibit a bandwidth greater than an octave, it will be appreciated that amplified signals 108 and 128 may exhibit a similar bandwidth, and that undesired components 108B and 128B cannot be easily suppressed through conventional limited band filtering techniques.

It will be appreciated that because received signals 104 and 124 are out of phase with each other (due to the rotation of antenna element 122), desired components 108A and 128B of such signals will likewise be out of phase with each other. However, undesired components 108B and 128B will be in phase with each other.

Amplified signals 108 and 128 are provided to phase shifters 110 and 130, respectively, which may be configured to adjust the phase of amplified signals 108 and 128 by different phase amounts. For example, as shown in FIG. 1, phase shifter 110 may be configured to shift amplified signal 108 by approximately zero degrees, and phase shifter 130 may be configured to shift amplified signal 128 by approximately 180 degrees.

Accordingly, phase shifter 110 provides an output signal 112 exhibiting a phase shift of approximately zero degrees in comparison with amplified signal 108. In this regard, output signal 112 includes a desired component 112A corresponding to desired component 108A of amplified signal 108, and an undesired component 112B corresponding to undesired component 108B.

Phase shifter 130 provides an output signal 132 exhibiting a phase shift of approximately 180 degrees (e.g., approximately +180 degrees or approximately −180 degrees) in comparison with amplified signal 128. In this regard, output signal 132 includes a desired component 132A that is out of phase with desired component 128A of amplified signal 128, and an undesired component 132B that is out of phase with undesired component 128B. Accordingly, it will be appreciated that desired components 112A and 132A of output signals 112 and 132 are in phase with each other, and undesired components 112B and 132B are out of phase with each other.

Power combiner/splitter 140 may optionally apply a desired phase shift to each of amplified signals 112 and 132 before combining them to provide a combined signal 150. In the embodiment of FIG. 1, no phase shift is applied to output signals 112 and 132. Because of the previously identified phase relationships of the various components of output signals 112 and 132, it will be appreciated that the combination of desired components 112A and 132A may provide a desired component 150A of combined signal 150.

It will also be appreciated that the combination of undesired components 112B and 132B may partially or completely cancel each other in combined signal 150. In the event that undesired components 112B and 132B do not completely cancel (e.g., due to differences between the upper and lower signal paths 170 and 180), combined signal 150 may include a small undesired component 150B.

As illustrated in FIG. 1, the amplitude of desired component 150A may be significantly greater than that of undesired component 150B in combined signal 150. In addition, the amplitude of undesired component 150B may be significantly reduced in comparison to undesired components 108B, 112B, 128B, and 132B elsewhere in signal paths 170 and 180 of phased array antenna system 100.

It will be appreciated that the embodiment of FIG. 1 may be extended to other phased array antenna systems that include large numbers of signal paths 170 and 180. For example, in one embodiment, half of the antenna elements of a phased array antenna system may be implemented as antenna elements 102, and another half may be implemented as antenna elements 122 which are physically rotated approximately 180 degrees in relation to antenna elements 102.

Phase relationships between the various signal components discussed above can be further understood by way of the following example. The transfer function of a perfectly linear amplifier can be described by the following expression:

$V_{out}(t)=a_1 V_{in}(t)$, where $a_1$ is the voltage gain of the perfectly linear amplifier. In contrast, the transfer function of an AC coupled, non-linear amplifier (for example, each of amplifiers 106 and 126) can be described by the following expression:

$V_{out}(t)=a_1 V_{in}(t)+a_2 V_{in}^2(t)+a_3 V_{in}^3(t)+ \ldots$

If received signal 104 is represented as: $V_{in}(t)=\sin(\omega t)$, then amplified signal 108 may be represented as:

$V_{out}(t)=a_1 \sin(\omega t)+a_2(0.5 \cos(2\omega t))+ \ldots$, where $a_1 \sin(\omega t)$ corresponds to desired component 108A and where $a_2(0.5 \cos(2\omega t))$ corresponds to undesired component 108B.

Similarly, received signal 124 may be represented as:

$V_{in}(t)=\sin(\omega t+180°)$, which is 180 degrees out of phase with received signal 104 due to the physical orientation of antenna element 122 in relation to antenna element 102. As a result, amplified signal 128 may be represented as:

$V_{out}(t)=a_1 \sin(\omega t+180°)+a_2(0.5 \cos(2\omega t+360°))+ \ldots$, where $a_1 \sin(\omega t+180°)$ corresponds to desired component 128A and where $a_2(0.5 \cos(2\omega t+360°))$ corresponds to undesired component 128B.

It will be appreciated that in this example desired components 108A and 128A are out of phase with each other, and undesired components 108B and 128B are in phase with each other. Accordingly, if amplified signal 128 is phase shifted, for example by 180 degrees by phase shifter 130, the resulting output signal 132 may be represented as:

$V_{out}(t)=a_1 \sin(\omega t)+a_2(0.5 \cos(2\omega t+180°))+ \ldots$ where $a_1 \sin(\omega t)$ corresponds to desired component 132A and where $a_2(0.5 \cos(2\omega t+180°))$ corresponds to undesired component 132B.

Because phase shifter 110 does not alter amplified signal 108 (i.e., amplified signal 108 is phase shifted by zero degrees), output signal 112 may be represented as:

$V_{out}(t)=a_1 \sin(\omega t)+a_2(0.5 \cos(2\omega t))+ \ldots$, where $a_1 \sin(\omega t)$ corresponds to desired component 112A and where $a_2(0.5 \cos(2\omega t))$ corresponds to undesired component 112B.

Therefore, when output signals 112 and 132 are combined by power combiner/splitter 140, desired components 112A and 132A combine with each other to provide desired component 150A which may be represented as: $2a_1 \sin(\omega t)$, and undesired components 112B and 132B cancel with each other. As a result, amplified signal 128 is effectively subtracted from amplified signal 108 to provide combined signal 150.

Figure 2:
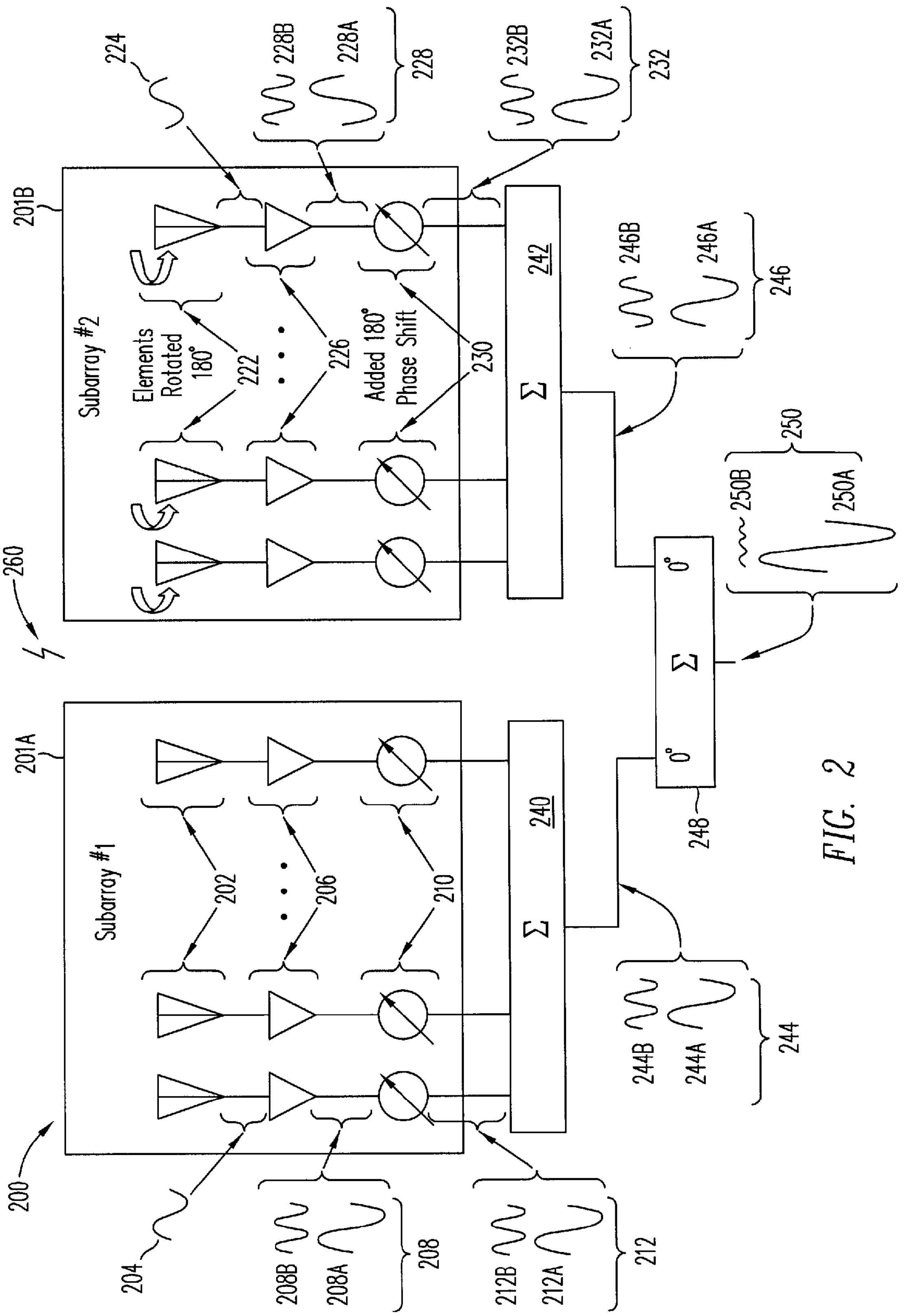
FIG. 2 illustrates a phased array antenna system having two subarrays in accordance with an embodiment of the present invention.

FIG. 2 illustrates a phased array antenna system 200 having two subarrays 201A and 201B in accordance with an embodiment of the present invention. As shown in FIG. 2, each of subarrays 201A and 201B include a plurality of antenna elements 202 and 222, a plurality of amplifiers 206 and 226, and a plurality of phase shifters 210 and 230, respectively. In addition, subarrays 201A and 201B include power combiners/splitters 240 and 242, respectively. Phased array antenna system 200 further includes an additional power combiner/splitter 248. In various embodiments, all components of FIG. 2 may be implemented to accommodate signals having bandwidths greater than one octave.

Each of antenna elements 202, amplifiers 206, and phase shifters 210 may be implemented in accordance with the various corresponding components of signal path 170 previously described in relation to FIG. 1. Similarly, each of antenna elements 222, amplifiers 226, and phase shifters 230 may be implemented in accordance with the various corresponding components of signal path 180 previously described in relation to FIG. 1.

Accordingly, it will be appreciated that antenna elements 202 and 222 may be configured to intercept radio signal 260 which may exhibit a bandwidth greater than one octave. In addition, each of antenna elements 222 is rotated approximately 180 degrees in relation to a corresponding one of antenna elements 202. Therefore, received signals 224 provided by antenna elements 222 in response to radio signal 260 will exhibit a phase offset of approximately 180 degrees when compared to received signals 204 provided by antenna elements 222.

Amplifiers 206 and 226 may provide amplified signals 208 and 228, respectively, with each of amplified signals 208 and 228 exhibiting a bandwidth greater than an octave, as well as corresponding desired components 208A and 228A, and corresponding undesired components 208B and 228B. As illustrated, desired components 208A and 228A are out of phase with each other, and undesired components 208B and 228B are in phase with each other.

As also illustrated in FIG. 2, phase shifters 210 are configured to shift amplified signal 208 by approximately zero degrees, and phase shifters 230 are configured to shift amplified signal 228 by approximately 180 degrees. Accordingly, phase shifters 210 provide output signals 212 exhibiting a phase shift of approximately zero degrees and including desired components 212A corresponding to desired components 208A of amplified signals 208, and undesired components 212B corresponding to undesired components 208B.

Phase shifters 230 provide output signals 232 exhibiting a phase shift of approximately 180 degrees and including desired components 232A that are out of phase with desired components 228A of amplified signals 228, and undesired components 232B that are out of phase with undesired components 228B. Accordingly, it will be appreciated that desired components 212A and 232A are in phase with each other, and undesired components 212B and 232B are out of phase with each other.

Output signals 212 are combined by power combiner/splitter 240 to provide an output signal 244 having a desired component 244A (i.e., representing the sum of desired components 212A of output signals 212) and an undesired component 244B (i.e., representing the sum of undesired components 212B of output signals 212). Output signals 232 are combined in similar fashion by a power combiner/splitter 242 to provide an output signal 246 having a desired component 246A (i.e., representing the sum of desired components 232A of output signals 232) and an undesired component 246B (i.e., representing the sum of undesired components 232B of output signals 232). Accordingly, it will be appreciated that desired components 244A and 246A are in phase with each other, and that undesired components 244B and 246B are out of phase with each other.

Output signals 244 and 246 are combined by power combiner/splitter 248 to provide a combined signal 250. Similar to power combiner/splitter 140 of FIG. 1, power combiner/splitter 248 may optionally apply a desired phase shift to each of output signals 244 and 246 before combining them to provide combined signal 250. However, in the embodiment of FIG. 2, no phase shift is applied by power combiner/splitter 248.

Similar to the embodiment previously discussed in FIG. 1, it will be appreciated that the combination of desired components 244A and 246A may provide a desired component 250A of combined signal 250. It will also be appreciated that the combination of undesired components 244B and 246B may partially or completely cancel each other in combined signal 250. Accordingly, in the event that undesired components 244B and 246B do not completely cancel (e.g., due to differences between first and second subarrays 201A/201B and their associated components), combined signal 250 may include a small undesired component 250B exhibiting only a small amplitude.

Figure 3:
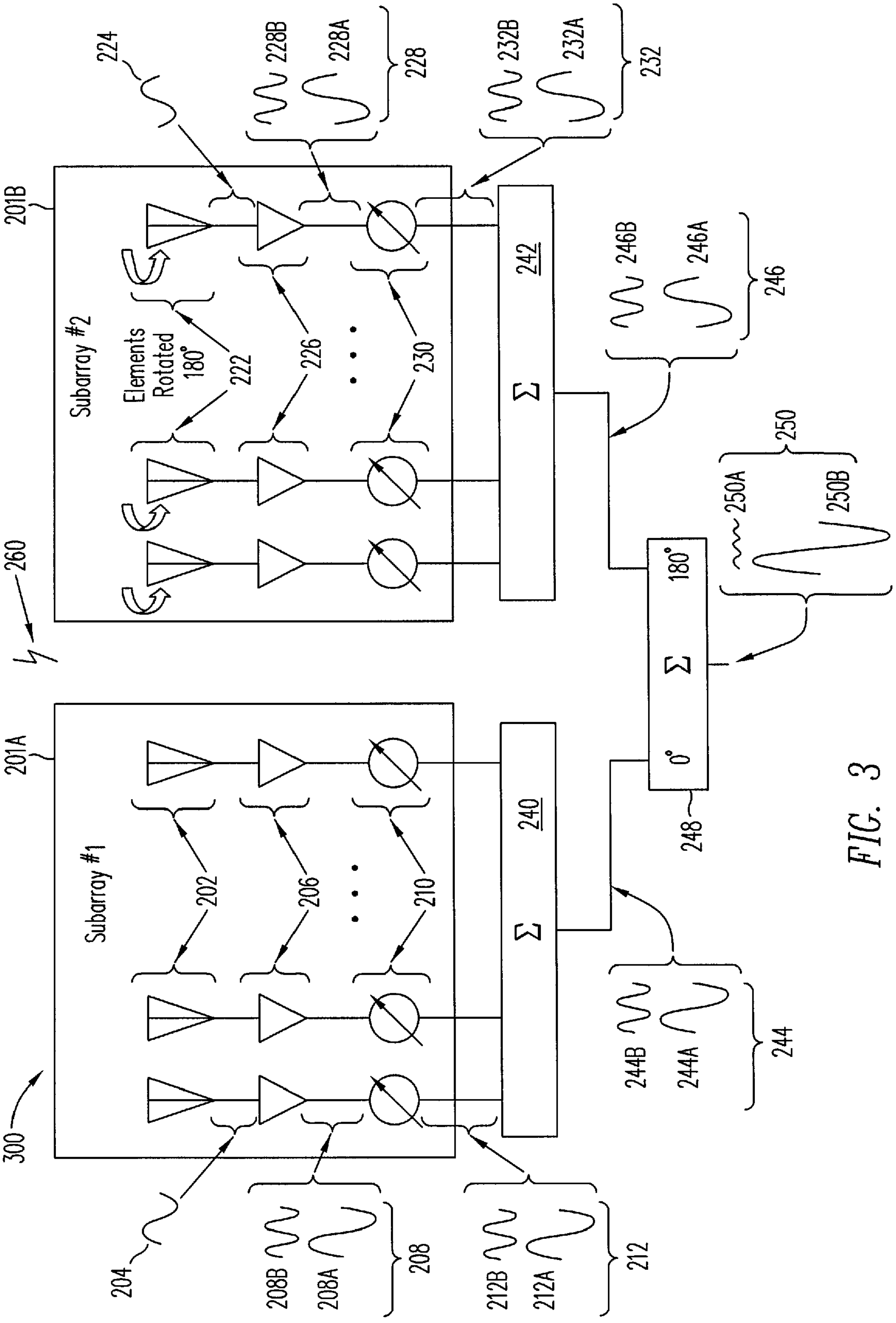
FIG. 3 illustrates another phased array antenna system having two subarrays in accordance with an embodiment of the present invention.

FIG. 3 illustrates another phased array antenna system 300 having two subarrays 201A and 201B in accordance with an embodiment of the present invention. Upon inspection of FIG. 3, it will be appreciated that the various components of phased array antenna system 300 generally correspond to those of phased array antenna system 200 illustrated in FIG. 2. Accordingly, only the differences between the embodiments of FIGS. 2 and 3 will be discussed below.

Comparing FIGS. 2 and 3, it will be appreciated that phase shifters 230 are configured in FIG. 3 to provide a phase shift of approximately zero degrees (i.e., no phase shift) to amplified signals 228. As a result, output signal 232 of FIG. 3 will correspond to amplified signal 228. Accordingly, desired components 244A and 246A of output signals 244 and 246 will be out of phase with each other, and the undesired components 244B and 246B will be in phase with each other in FIG. 3.

It will also be appreciated that power combiner/splitter 248 is configured in FIG. 3 to provide a phase shift of approximately 180 degrees to second subarray signal 246, and no phase shift to first subarray signal 244. As a result, when first and second subarray signals 244 and 246 are combined in FIG. 3, desired components 244A and 246A will be in phase with each other and provide desired component 250A of combined signal 250.

On the other hand, undesired components 244B and 246B will be out of phase with each other and therefore may partially or completely cancel each other in combined signal 250 of FIG. 3. Accordingly, in the event that undesired components 244B and 246B do not completely cancel (e.g., due to differences between first and second subarrays 201A/201B and their associated components), combined signal 250 may include a small undesired component 250B exhibiting only a small amplitude as shown in FIG. 3.

In another embodiment, the suppression of even order products (e.g., second harmonics) may be further improved in the embodiments of FIGS. 2 and 3 by adjusting the relative phase of output signals 244 and 246 provided to power combiner/splitter 248. In this regard, the phase shift applied by a subset of individual phase shifters 210 and/or 230 may be independently adjusted. The relative amplitude of output signals 244 and 246 provided to power combiner/splitter 248 may also be independently adjusted by, for example, disabling a subset of individual amplifiers 206 and/or 226.

Figure 4:
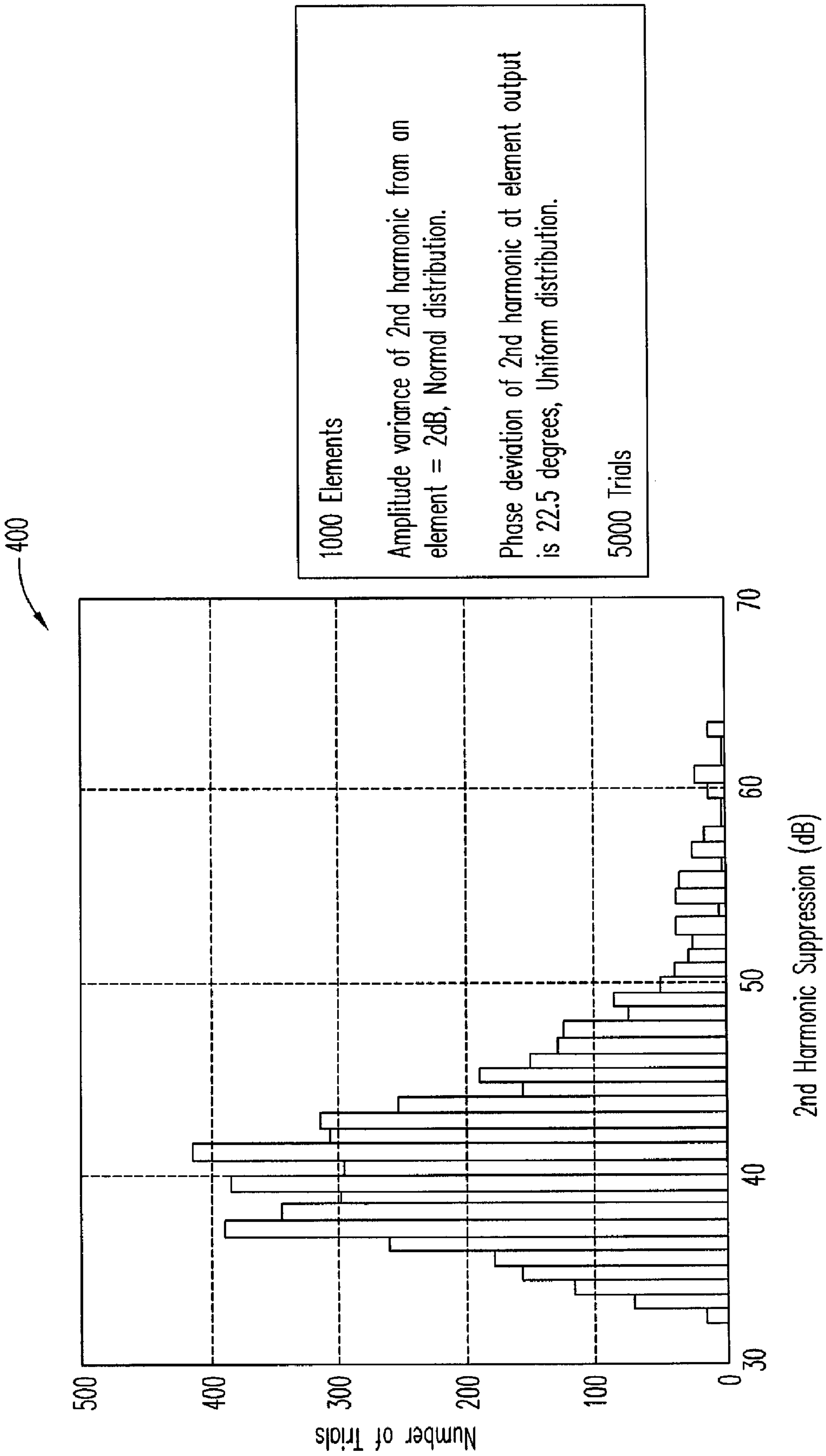
FIG. 4 illustrates a graph of predicted performance of a phased array antenna system in accordance with an embodiment of the present invention.

FIG. 4 illustrates a graph 400 of predicted performance of a phased array antenna system in accordance with an embodiment of the present invention. Specifically, graph 400 illustrates the results of an analysis performed using Matlab software for a phased array antenna system having 1000 antenna elements, with 500 of the antenna elements physically rotated 180 degrees relative to the remaining 500 antenna elements. In this regard, it will be appreciated that the embodiment illustrated in FIG. 1 may be extended to include, for example, 500 pairs of signal paths 170 and 180.

In the analysis, signals received by all of the antenna elements were assumed to exhibit a phase deviation of ±22.5 degrees in a uniform distribution. The received signals were individually amplified by amplifiers exhibiting a second harmonic variance of 2 dB in a normal distribution. Accordingly, it will be appreciated that such amplifiers may not be perfectly matched with each other in this example. The amplified signals associated with the 500 rotated antenna elements were phase shifted by 180 degrees before being combined with the remaining amplified signals to provide a combined signal.

As shown, over the course of 5000 trials, the second harmonic (i.e., an undesired component) exhibited by the combined signal was suppressed by a minimum of 32 dB in comparison with the original amplified signals. Accordingly, it will be appreciated that even with possible deviations from ideal signal paths, the various techniques disclosed herein can significantly reduce the amplitude of undesired signal components introduced by non-ideal amplifiers of a phased array antenna system.

It will be appreciated that the above-described embodiments of the present invention have been directed primarily to phased array antenna systems configured to receive radio signals. However, the principles discussed herein may also be applied to phased array antenna systems configured to transmit radio signals in accordance with additional embodiments of the present invention.

Figure 5:
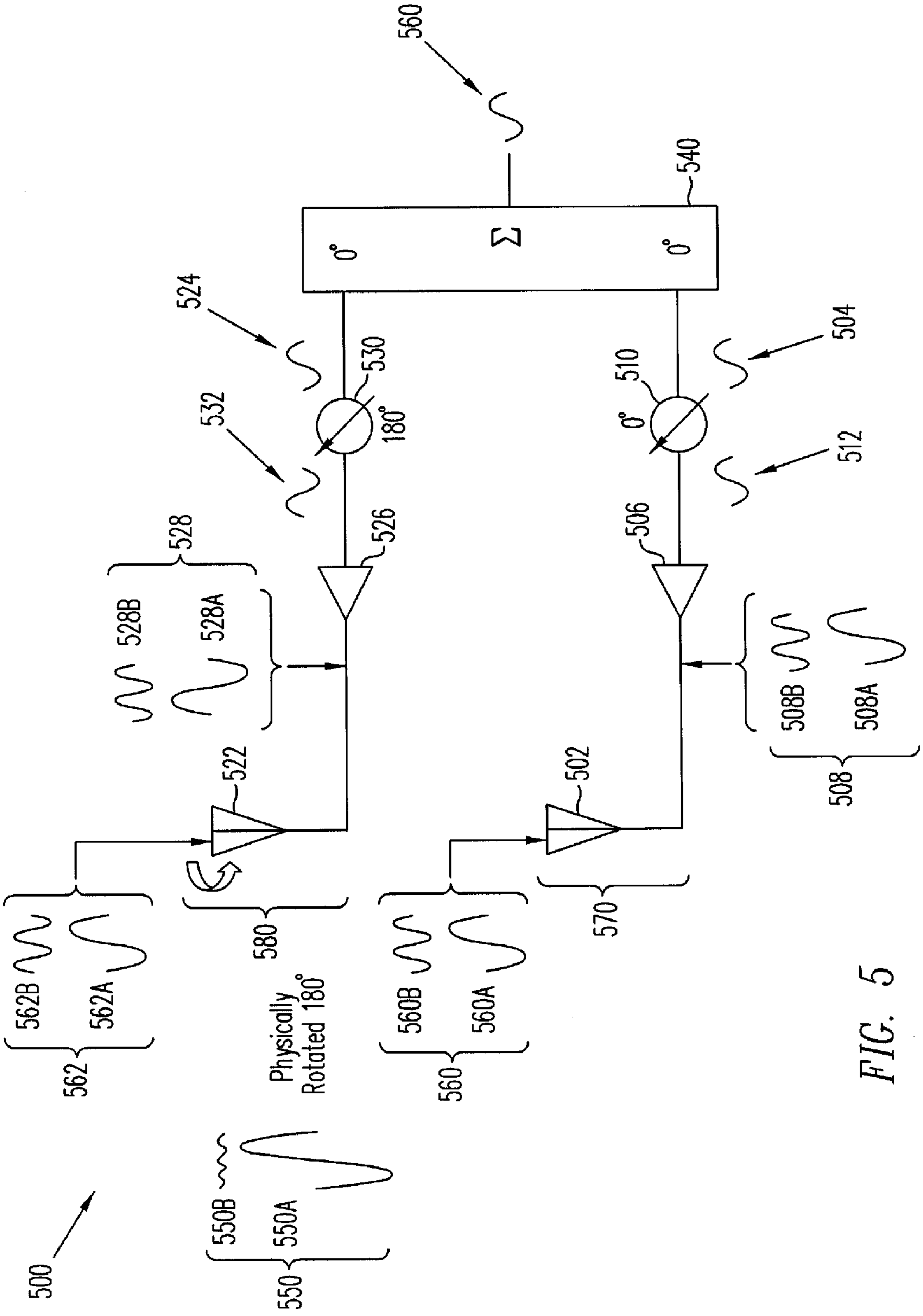
FIG. 5 illustrates another phased array antenna system configured to suppress undesired components of amplified signals in accordance with an embodiment of the present invention.

In this regard, FIG. 5 illustrates another phased array antenna system 500 configured to suppress undesired components of amplified signals in accordance with an embodiment of the present invention. Similar to FIG. 1, phased array antenna system 500 includes signal paths 570 and 580 which include associated antenna elements 502 and 522, amplifiers 506 and 526, and phase shifters 510 and 530. As illustrated, phased array antenna system 500 also includes a power combiner/splitter 540. In various embodiments, all components of FIG. 5 may be implemented to accommodate signals having bandwidths greater than one octave.

Comparing the embodiments of FIGS. 1 and 5, it will be appreciated that the signal flow of FIG. 5 is reversed in comparison with FIG. 1. For example, amplifiers 506 and 526 of FIG. 5 are reversed in comparison to FIG. 1 in order to facilitate the providing of amplified signals to antenna elements 502 and 522 for transmission from antenna elements 502 and 522 as will be further described herein.

Power combiner/splitter 540 may be configured to receive a signal 560 that exhibits a bandwidth greater than one octave to be transmitted from phased array antenna system 500. Power combiner/splitter 540 may split signal 560 into a first input signal 504 and a second input signal 524. Power combiner/splitter 540 may optionally apply a desired phase shift to each of input signals 504 and 524. However, in the particular embodiment illustrated in FIG. 5, no phase shift is applied to input signals 504 and 524 by power combiner/splitter 540.

Input signals 504 and 524 are provided to phase shifters 510 and 530, respectively, which may be configured to adjust the phase of input signals 504 and 524 by different phase amounts. For example, as shown in FIG. 5, phase shifter 110 may be configured to shift input signal 504 by approximately zero degrees, and phase shifter 530 may be configured to shift input signal 524 by approximately 180 degrees.

Accordingly, phase shifter 510 provides an output signal 512 exhibiting a phase shift of approximately zero degrees in comparison with input signal 504. Phase shifter 530 provides an output signal 532 exhibiting a phase shift of approximately 180 degrees in comparison with input signal 524.

Output signals 512 and 532 are provided to amplifiers 506 and 526, respectively, which amplify output signals 512 and 532 to create amplified signals 508 and 528, respectively. Each of amplifiers 506 and 526 may exhibit a non-linear transfer function. As a result, amplified signals 508 and 528 may each exhibit undesired signal components.

As similarly discussed in relation to FIG. 1, amplified signal 508 may be viewed as a composite signal that includes an a desired component 508A (i.e., an amplified version of output signal 512) and an undesired component 508B introduced by amplifier 506. Similarly, amplified signal 528 may also be viewed as a composite signal that includes a desired component 528A (i.e., an amplified version of output signal 532) and an undesired component 528B introduced by amplifier 526. Because signal 560 and corresponding input signals 504 and 524 may exhibit a bandwidth greater than an octave, it will be appreciated that amplified signals 508 and 528 may exhibit a similar bandwidth, and that undesired components 508B and 528B cannot be easily suppressed through conventional limited band filtering techniques.

It will be appreciated that because output signals 512 and 532 are out of phase with each other (due to the phase shift introduced by phase shifter 530), desired components 508A and 528B of such signals will likewise be out of phase with each other. However, undesired components 508B and 528B will be in phase with each other.

Amplified signals 508 and 528 are provided to antenna elements 502 and 522, which transmit corresponding radio signals 560 and 562. In this regard, antenna elements 502 and 522 may be configured to transmit signals that exhibit a bandwidth greater than one octave. Antenna elements 502 and 522 may be implemented as any appropriate structures which may be used to transmit radio signals 560 and 562 such as, for example, dipole antennas, horn antennas, or other appropriate structures.

As shown in FIG. 5, antenna element 522 is physically rotated approximately 180 degrees in relation to antenna element 502. As a result, radio signal 562 provided by antenna element 522 in response to amplified signal 528 will exhibit a phase shift of approximately 180 degrees when compared to amplified signal 528. In this regard, radio signal 562 includes a desired component 562A that is out of phase with desired component 528A of amplified signal 528, and an undesired component 562B that is out of phase with undesired component 528B.

As illustrated, radio signal 560 exhibits a phase shift of approximately zero degrees in comparison with amplified signal 508. In this regard, radio signal 560 includes a desired component 560A corresponding to desired component 508A of amplified signal 108, and an undesired component 562B corresponding to undesired component 508B.

Accordingly, it will be appreciated that desired components 560A and 562A of radio signals 560 and 562 are in phase with each other, and undesired components 560B and 562B are out of phase with each other. Transmitted radio signals 560 and 562 may combine to provide a combined signal 550. Because of the previously identified phase relationships of the various components of radio signals 560 and 562, it will be appreciated that the combination of desired components 560A and 562A may provide a desired component 550A of combined signal 550.

It will also be appreciated that the combination of undesired components 560B and 562B may partially or completely cancel each other in combined signal 550. In the event that undesired components 560B and 562B do not completely cancel (e.g., due to differences between the upper and lower signal paths 570 and 580), combined signal 550 may include a small undesired component 550B.

As illustrated in FIG. 5, the amplitude of desired component 550A may be significantly greater than that of undesired component 550B in combined signal 550. In addition, the amplitude of undesired component 550B may be significantly reduced in comparison to undesired components 508B, 528B, 560B, and 562B elsewhere in signal paths 570 and 580 of phased array antenna system 500.

It will be appreciated that the embodiment of FIG. 5 may be extended to other phased array antenna systems that include large numbers of signal paths 570 and 580. For example, in one embodiment, half of the antenna elements of a phased array antenna system may be implemented as antenna elements 502, and another half may be implemented as antenna elements 522 which are physically rotated approximately 180 degrees in relation to antenna elements 502.

It will further be appreciated that the embodiments of FIGS. 2 and 3 previously discussed in relation to the reception of radio signals may be modified in accordance with the above discussion of FIG. 5 for the transmission of radio signals. For example, it is contemplated that the various signal paths illustrated in FIGS. 2 and 3 may be reversed to accommodate the transmission of radio signals as similarly described above in relation to FIG. 5.

It will be appreciated that various embodiments of the present invention discussed herein may be modified to provide additional embodiments. For example, one or more of the above-described embodiments may be combined in a phased array antenna system supporting both the reception and transmission of radio signals.

As another example, various components of one or more of the signal paths illustrated in FIGS. 1-3 and 5 may be implemented in a shared monolithic microwave integrated circuit (MMIC) chip. Alternatively, such components may be implemented in physically different locations of a phased array antenna system. As a further example, various pairs of amplifiers 106/126, 206/226, and/or 506/526 sharing the same designs may be closely matched and implemented on a common wafer.

As another example, in the embodiments of FIGS. 1 and 5, phase shifters 110/510 and 130/530 may be configured to provide phase shifts of approximately −90 degrees and approximately +90 degrees, respectively, or any other combination that implements a combined phase difference of approximately 180 degrees. It will be appreciated that similar modifications could be made to phase shifters 210 and 230 of FIGS. 2 and 3.

As another example, phase shifters 110/510 and 130/530 may be configured to provide no phase shift. In this case, power combiner/splitter 140 or 540 may be implemented to phase shift output signals 112/132 or input signals 504/524 approximately 180 degrees from each other.

It will be appreciated that phased array antenna systems implemented in accordance with various embodiments discussed herein may additionally support beam steering. In this case, the particular phase shifts applicable for a desired beam pattern may be superimposed on the various phase amounts discussed herein for one or more of phase shifters 110/130, 210/230, and 510/530 to adjust the phase amounts used by individual phase shifters 110/130, 210/230, and 510/530. Accordingly, the various embodiments discussed herein can be used to suppress undesired components (e.g., even order products) for amplified signals corresponding to signals received at a desired scan angle relative to antenna elements 102/122 and 202/222. Signals received at other angles may be attenuated by the phased array antenna pattern. Similarly, appropriate beam steering may be implemented for radio signals 560/562 transmitted from antenna elements 502/522.

It will further be appreciated that references to 180 degrees set forth in this disclosure may include +180 degrees and/or −180 degrees. For example, it will be understood that any of phase shifters 110/130, 210/230, and 510/530, power combiners/splitters 140, 248, and 540, and antenna elements 102/122, 202/222, and 502/522 may be implemented to provide phase shifts of approximately 180 degrees which may include approximately +180 degrees and/or approximately −180 degrees. It will further be appreciated that power combiners/splitters 140, 240, 242, 248, and 540 may be selectively implemented as power combiners and/or power splitters as may be desired for particular applications.

In view of the present disclosure, it will be appreciated that various features set forth herein provide significant improvements to the suppression of undesired signal components introduced by non-linear amplifiers of phased array antenna systems to support bandwidths greater than one octave. Advantageously, by orienting various antenna elements of the system by approximately 180 degrees relative to other corresponding antenna elements and applying one or more appropriate phase shifts, undesired signal components such as even order products created by the amplifiers can be suppressed. In addition, the various techniques discussed herein may be applied without costly, extensive redesigns of existing system components.

Embodiments described above illustrate but do not limit the invention. It should also be understood that numerous modifications and variations are possible in accordance with the principles of the present invention. Accordingly, the scope of the invention is defined only by the following claims.

We claim:

1. A phased array antenna system comprising:

a first antenna element adapted to provide a first received signal in response to a radio signal;

a second antenna element adapted to provide a second received signal in response to the radio signal, wherein the second antenna element is rotated approximately 180 degrees in relation to the first antenna element;

a first amplifier adapted to amplify the first received signal to provide a first amplified signal having a bandwidth greater than one octave and having a first undesired component introduced by the first amplifier;

a second amplifier adapted to amplify the second received signal to provide a second amplified signal having a bandwidth greater than one octave and having a second undesired component introduced by the second amplifier;

a first phase shifter adapted to adjust a phase of the first amplified signal by a first phase amount to provide a first output signal;

a second phase shifter adapted to adjust a phase of the second amplified signal by a second phase amount to provide a second output signal; and a power combiner adapted to combine the first and second output signals to provide a combined signal, wherein the first and second undesired components are suppressed in the combined signal relative to the first and second amplified signals.

2. The phased array antenna system of claim 1, wherein the first and second phase amounts exhibit a combined phase difference of approximately 180 degrees.

3. The phased array antenna system of claim 2, wherein the first phase amount is approximately 0 degrees and the second phase amount is approximately 180 degrees.

4. The phased array antenna system of claim 2, wherein the first phase amount is approximately −90 degrees, and wherein the second phase amount is approximately +90 degrees.

5. The phased array antenna system of claim 1, wherein the first and second phase amounts are approximately 0 degrees, wherein the power combiner is adapted to adjust a phase of the first output signal by a third phase amount and further adapted to adjust a phase of the second output signal by a fourth phase amount.

6. The phased array antenna system of claim 1, wherein the first and second undesired components correspond to an even order product.

7. The phased array antenna system of claim 6, wherein the even order product is a second harmonic.

8. The phased array antenna system of claim 1, wherein the first antenna element, first amplifier, and first phase shifter comprise a first subarray of the phased array antenna system, and the second antenna element, second amplifier, and second phase shifter comprise a second subarray of the phased array antenna system.

9. The phased array antenna system of claim 1, wherein each of the first and second phase shifters is adapted to independently adjust its associated first and second phase amounts to support beam steering by the phased array antenna system.

10. A method of suppressing undesired signal components, the method comprising:

receiving a radio signal at a first antenna element and a second antenna element of a phased array antenna system, wherein the second antenna element is rotated approximately 180 degrees in relation to the first antenna element;

providing first and second received signals from the first and second antenna elements, respectively, in response to the radio signal;

amplifying the first received signal to provide a first amplified signal having a bandwidth greater than one octave and having a first undesired component;

amplifying the second received signal to provide a second amplified signal having a bandwidth greater than one octave and having a second undesired component;

adjusting a phase of the first amplified signal by a first phase amount to provide a first output signal;

adjusting a phase of the second amplified signal by a second phase amount to provide a second output signal; and combining the first and second output signals to provide a combined signal, wherein the first and second undesired components are suppressed in the combined signal relative to the first and second amplified signals.

11. The method of claim 10, wherein the first and second phase amounts exhibit a combined phase difference of approximately 180 degrees.

12. The method of claim 11, wherein the first phase amount is approximately 0 degrees and the second phase amount is approximately 180 degrees.

13. The method of claim 11, wherein the first phase amount is approximately −90 degrees, and wherein the second phase amount is approximately +90 degrees.

14. The method of claim 10, wherein the first and second phase amounts are approximately 0 degrees, wherein the combining operation further comprises:

adjusting a phase of the first output signal by a third phase amount; and adjusting a phase of the second output signal by a fourth phase amount.

15. The method of claim 10, wherein the first and second undesired components correspond to an even order product.

16. The method of claim 15, wherein the even order product is a second harmonic.

17. The method of claim 10, further comprising adjusting at least one of the first or second phase amounts applied by a subset of phase shifters of a subarray of the phased array antenna system.

18. The method of claim 10, further comprising disabling a subset of amplifiers of a subarray of the phased array antenna system.

19. A phased array antenna system comprising:

a power splitter adapted to split a received signal to provide a first input signal and a second input signal;

a first phase shifter adapted to adjust a phase of the first input signal by a first phase amount to provide a first output signal;

a second phase shifter adapted to adjust a phase of the second input signal by a second phase amount to provide a second output signal;

a first amplifier adapted to amplify the first output signal to provide a first amplified signal having a bandwidth greater than one octave and having a first undesired component introduced by the first amplifier;

a second amplifier adapted to amplify the second output signal to provide a second amplified signal having a bandwidth greater than one octave and having a second undesired component introduced by the second amplifier;

a first antenna element; and a second antenna element rotated approximately 180 degrees in relation to the first antenna element, wherein the first and second antenna elements are adapted to transmit the first and second amplified signals, respectively to provide a combined signal, wherein the first and second undesired components are suppressed in the combined signal relative to the first and second amplified signals.

20. The phased array antenna system of claim 19, wherein the first and second phase amounts exhibit a combined phase difference of approximately 180 degrees.

21. The phased array antenna system of claim 20, wherein the first phase amount is approximately 0 degrees and the second phase amount is approximately 180 degrees.

22. The phased array antenna system of claim 20, wherein the first phase amount is approximately −90 degrees, and wherein the second phase amount is approximately +90 degrees.

23. The phased array antenna system of claim 19, wherein the first and second phase amounts are approximately 0 degrees, wherein the power splitter is adapted to adjust a phase of the first output signal by a third phase amount and further adapted to adjust a phase of the second output signal by a fourth phase amount.

24. The phased array antenna system of claim 19, wherein the first and second undesired components correspond to an even order product.

25. The phased array antenna system of claim 24, wherein the even order product is a second harmonic.

26. The phased array antenna system of claim 19, wherein the first antenna element, first amplifier, and first phase shifter comprise a first subarray of the phased array antenna system, and the second antenna element, second amplifier, and second phase shifter comprise a second subarray of the phased array antenna system.

27. The phased array antenna system of claim 19, wherein each of the first and second phase shifters is adapted to independently adjust its associated first and second phase amounts to support beam steering by the phased array antenna system.

28. A method of suppressing undesired signal components, the method comprising:

splitting a received signal to provide a first input signal and a second input signal;

adjusting a phase of the first input signal by a first phase amount to provide a first output signal;

adjusting a phase of the second input signal by a second phase amount to provide a second output signal;

amplifying the first output signal to provide a first amplified signal having a bandwidth greater than one octave and having a first undesired component;

amplifying the second output signal to provide a second amplified signal having a bandwidth greater than one octave and having a second undesired component; and providing a combined signal, wherein the providing comprises:

transmitting the first amplified signal from a first antenna element of a phased array antenna system, and transmitting the second amplified signal from a second antenna element of the phased array antenna system, wherein the second antenna element is rotated approximately 180 degrees in relation to the first antenna element, wherein the first and second undesired components are suppressed in the combined signal relative to the first and second amplified signals.

29. The method of claim 28, wherein the first and second phase amounts exhibit a combined phase difference of approximately 180 degrees.

30. The method of claim 29, wherein the first phase amount is approximately 0 degrees and the second phase amount is approximately 180 degrees.

31. The method of claim 29, wherein the first phase amount is approximately −90 degrees, and wherein the second phase amount is approximately +90 degrees.

32. The method of claim 28, wherein the first and second phase amounts are approximately 0 degrees, wherein the splitting operation further comprises:

adjusting a phase of the first input signal by a third phase amount; and adjusting a phase of the second input signal by a fourth phase amount.

33. The method of claim 28, wherein the first and second undesired components correspond to an even order product.

34. The method of claim 33, wherein the even order product is a second harmonic.

35. The method of claim 28, further comprising adjusting at least one of the first or second phase amounts applied by a subset of phase shifters of a subarray of the phased array antenna system.

36. The method of claim 28, further comprising disabling a subset of amplifiers of a subarray of the phased array antenna system.

* * * * *